United States Patent Office 3,613,308
Patented Oct. 19, 1971

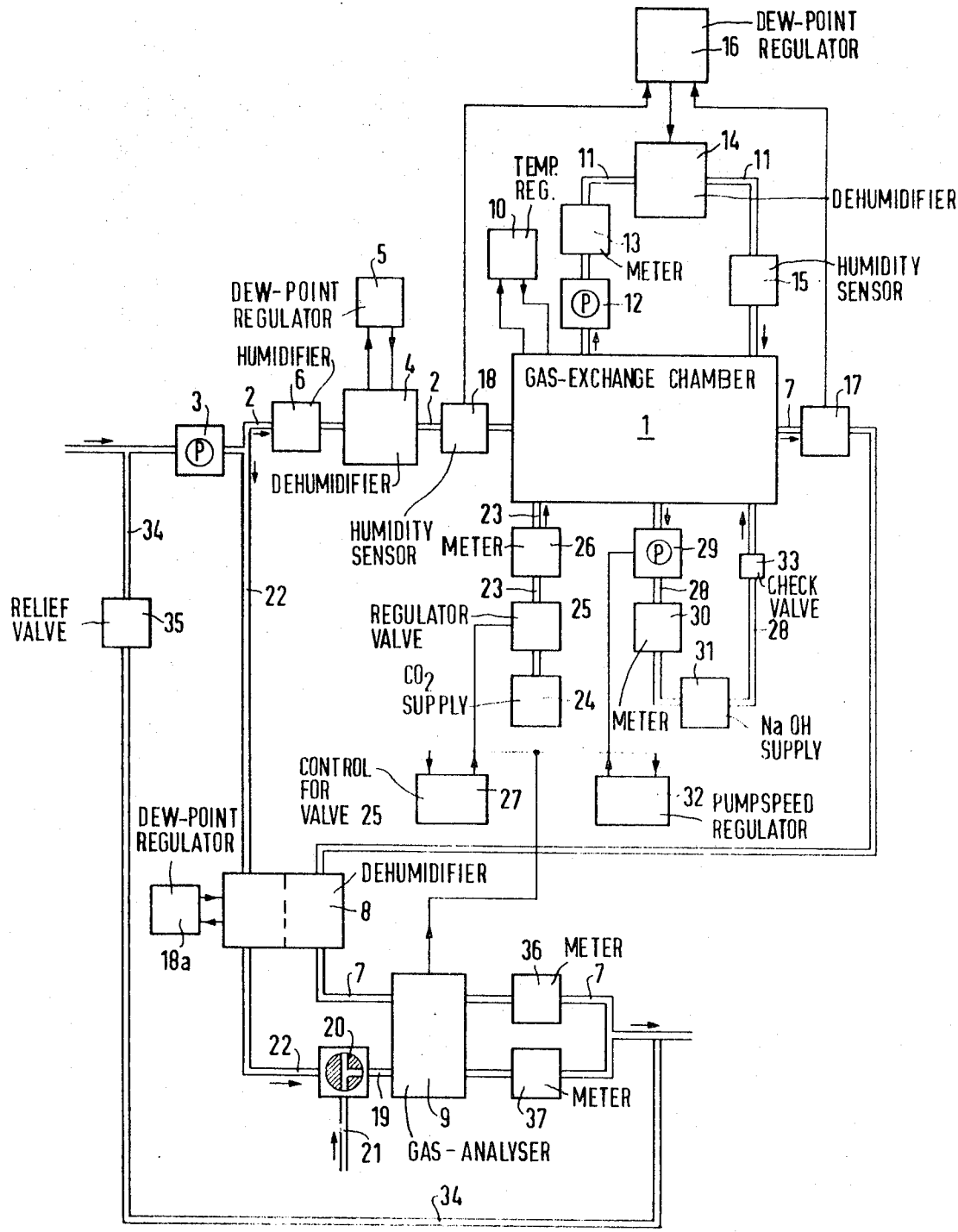

3,613,308
DEVICE FOR REGULATING AND DETERMINING CHANGES OF A $CO_2$ CONTENT IN A CLIMATIC GAS-EXCHANGE CHAMBER
Erwin Klein, Erlangen, Werner Koch, Grafrath, and Heinz Walz, Eltersdorf, Germany, assignors to Siemens Aktiengesellschaft, Berlin, Germany
Filed Apr. 30, 1969, Ser. No. 820,581
Claims priority, application Germany, Apr. 30, 1968,
P 17 73 320.9
Int. Cl. A01g 9/18
U.S. Cl. 47—17                                7 Claims

ABSTRACT OF THE DISCLOSURE

Described is a device for controlling and determining changes in the $CO_2$ content in a gas-exchange measuring chamber, which contains plants, living plant parts or organisms, air conditioned by peltier elements, and into which measuring gas can be pumped, via a gas line. A gas outlet contains a peltier-cooled dehumidifier and a gas analyzer, wherein a measured value can be determined as a difference between the $CO_2$ content of the measuring gas and the $CO_2$ content of a supplied standard gas. The device is so characterized that $CO_2$ gas can be supplied, via a regulating valve and a flow counter, to the gas-exchange measuring chamber. Also provided is a bypass to the gas-exchange measuring chamber, wherein a flow counter and means for changing the flow and for binding the $CO_2$ gas are arranged. The regulating valve and the devices which regulate the flow are each provided with a regulating system, wherein the control magnitude of each regulator constitutes the measured value of the gas analyzer.

---

Our invention relates to a device for regulating and determining changes in the $CO_2$ content in a gas-exchange measuring chamber which is air conditioned by peltier elements. The chamber contains plants, parts of living plants or organisms, into which a measuring gas can be pumped through a gas supply line, a peltier-cooled dehumidifier and a gas analyzer being connected in a gas outlet line. The analyzer furnishes a measuring value as a difference between the $CO_2$ content of the measuring gas and the $CO_2$ content of a supplied standard gas.

To investigate the fundamentals of vegetable material production, it is very important to measure the gas-exchange between plants and their environment, i.e. their absorption of $CO_2$ (photosynthesis), $CO_2$ emission (breathing) and their transpiration, under the most exactly defined conditions. The gas-exchange of the plants depends on the following physical conditions:

Intensity and wave length of the irradiated light;
Temperature;
$CO_2$ concentration in the air;
Moisture condition of the plant which among other things, depends on the humidity content in the air; and
Width of the aperture slit in the epidermis as the short term variable biological factor.

It is known to air condition a gas-exchange measuring chamber for this purpose, i.e. to regulate the temperature and the humidity content of the air in the measuring chamber. The location climate can be reproduced or an arbitrary climate can be simulated in the gas-exchange measuring chamber. Particularly suitable to this end is a gas-exchange chamber, whose temperature and humidity is regulated with peltier elements, as described in the paper by E. Klein and H. Walz, "Einige Anwendungsmöglichkeiten von Peltierkühlelementen" (Some Uses of Peltier Cooling Elements), in the G-I-T Trade Magazine for the Laboratory, vol. 11, 1967, pages 405 to 411. A peltier cooled dehumidifier which is used to regulate the humidity in the aforedescribed device is described by W. Koch and H. Walz, under the title "Neuer Wasserdampfabscheider mit Peltierkühlung als vielseitiges Zusatzgerät bei Gaswechselmessungen" (New Dehumidifier With Peltier Cooling Used as Versatile Supplement Device In Gas-Exchange Measurements), which appears in "Naturwissenschaftliche Rundschau," vol. 19, 1966, on page 163. This apparatus can adjust the temperature in the gas-exchange measuring chamber between about $-20°$ C. and about $+60°$ C., within $\pm 0.5°$ C. and the absolute humidity in the chamber to approximately 2%. The exactness obtained does not depend on the plants which are placed into the gas-exchange chamber or on disturbing influences in their environment.

During the assimilation and respiration of plants in a gas-exchange measuring chamber, the $CO_2$ concentration of the air in the chamber is changed through an absorption of $CO_2$ and an emission of $CO_2$ which also falsifies the obtained measuring value. It is known from a paper by D. Koller and J. Samisch in the "Botanical Gazette," 125 (2), 1964, pages 81 to 88, to add $CO_2$ to compensate for the $CO_2$ absorption during the assimilation in a gas-exchange measuring chamber. In a closed system, the gas analyzer is used as a null instrument wherein the $CO_2$ content of the air, pumped during circulation, is determined and wherein the compensating $CO_2$ gas, which is supplied via a manually controlled regulating valve, is used to measure the assimilation. The gas-exchange measuring chamber for plants is a transparent plastic bag which is regulated for moisture but not for temperature, whereby the aforementioned advantages of a regulation by means of peltier elements are not utilized. In this apparatus, the measuring value is falsified through a faulty air conditioning of the gas-exchange measuring chamber, wherein a "chamber climate" begins to develop. Also, this measuring method is inaccurate, primarily due to the provided control of the $CO_2$ addition and is, moreover, time consuming and continuous measurements are not feasible. Finally, the respiration of the plants cannot be determined by means of this measuring device.

It is an object of our invention to provide an apparatus by means of which the assimilation, the respiration and transpiration of plants can be determined without error, with a "chamber climate" and by changing the $CO_2$ content in the gas-exchange measuring chamber. Another objective is to afford an automatic and continuous measuring.

According to the invention, this problem is solved by the fact that $CO_2$ gas can be supplied, via a regulating valve and a flow-meter, to the gas-exchange measuring chamber, whereby a bypass to the gas-exchange measuring chamber, which contains a throughput counter and means for changing the flow or throughput and for binding the $CO_2$ gas, is provided. Moreover, a regulating system is provided respectively for the regulating valve and for the means for regulating the throughput. The measuring value of the gas analyzer constitutes the controlling or datum setting quantity of each regulating system.

A pump of variable pump velocity is preferably used to regulate the bypass throughput, while sodium hydroxide is the binder for the $CO_2$ gas. A gas having a $CO_2$ content of up to 20% can be supplied via the regulating valve to the gas-exchange measuring chamber.

For measuring in a closed system, the outlet of the gas analyzer and the gas inlet of the gas-exchange measuring chamber can be connected through a gas supply line. A pressure relief valve can be arranged between the gas analyzer and the gas supply line.

It is preferable to effect the measurements in an open system if the measuring gas, supplied to the gas-exchange measuring chamber, is transported through a gas supply line, which bridges the gas-exchange measuring chamber, to a dehumidifier and transported from there to the gas analyzer as a standard gas.

A falsification of the measuring values, occurring in a known way through air conditioning with peltier elements, is impossible in the apparatus, according to the invention. Falsification due to a change in the $CO_2$ content, through assimilation or respiration is also avoided, whereby measuring is effected automatically and, if necessary, continually. The gas analyzer, which can be an ultrared absorptive device, is used as a null instrument and measuring is effected according to a compensation method. The measuring value for assimilation is obtained with a throughput counter in the $CO_2$ outlet and for respiration with the aid of a flow meter, in the bypass. In an open system, a follow-up regulation of the $CO_2$ content is carried out in the gas-exchange measuring chamber, whereby the measuring gas, which is used in the gas analyzer was supplied to the gas-exchange chamber as a standard gas. This makes the $CO_2$ content in the gas-exchange measuring chamber comparable to the $CO_2$ content of the location. However, in an open, as well as in a closed system, a datum value regulation of the $CO_2$ content is feasible through the standard gas of the gas analyzer, which also makes possible a program control over a measuring process.

The device according to the invention, which is explained in detail in an embodiment example, will be shown in the figure, as follows:

The figure schematically illustrates a device used to determine the gas-exchange between plants and the environment, the plants being situated in a gas-exchange measuring chamber 1 which is air conditioned and whose $CO_2$ content is regulated.

The gas-exchange measuring chamber 1, such as that described in U.S. copending application Ser. No. 618,005, filed Feb. 23, 1967 now U.S. Pat. No. 3,473,022, which corresponds to French Pat. No. 1,512,188, is supplied with a measuring gas by a pump, via gas inlet 2. The gas supply 2 is a peltier-cooled dehumidifier 4, whose dew point is adjustable with the aid of a regulator 5 and is kept constant. The air supplied to the dehumidifier 4 is moistened by a humidifier 6 arranged in the gas supply line 2, ahead of the dehumidifier. The relative humidity of the air introduced into the gas-exchange measuring chamber 1, is regulated by the dew point of the dehumidifier 4. A gas outlet 7, after the gas-exchange has been effected, removes the measuring gas from the gas-exchange measuring chamber 1 and supplies said gas, via a second dehumidifier 8, to the gas analyzer 9, which can be an ultrared absorption apparatus. The dew point of the dehumidifier 8 is so adjusted with the aid of a regulator 18a, that measuring gas passing through is completely dried and a disruption of the measuring of the $CO_2$ content cannot occur in the gas analyzer 9.

The gas-exchange measuring chamber 1, which will be described hereinbelow in greater detail, and which corresponds to FIG. 2 of the above-mentioned application Ser. No. 618,005, is provided for cooling or heating purposes with peltier elements, which are combined into peltier blocks. The temperature is regulated by a regulator 10, which is arranged as a pilot value indicator for the temperature sensor, in the interior of the gas-exchange measuring or changing chamber 1.

The gas-exchange measuring chamber 1 is provided with a first gas line 11, which serves as a shunt. This shunt or bypass contains a pump 12, a flow meter 13, a dehumidifier 14 and a humidity detector 15. The pump 12 removes the air, from the gas-exchange measuring chamber 1, and forces it, via the dehumidifier 14, back into the gas-exchange measuring chamber. The throughput in this cycle is greater (usually 10 liters per minute) than the measuring gas throughput through the gas-exchange measuring chamber, via gas inlet 2 and gas outlet 7 (usually 1 liter per minute). The throughput in the bypass 11 is measured by the flow meter 13 and kept constant by pump 12. The dew point of the air, circulated in the bypass 11, is adjusted in the dehumidifier 14 with the aid of an electronic regulator 16, whereby the vapor emitted by the plant precipitates as water in this dehumidifier. The inner moisture measured in the gas outlet 7 by the humidity sensor 17, thus remains equal to the initial moisture measured in the gas line 2, as measured by the humidity sensor 18, which serves as a datum value transmitter. The transpiration $Tr$ is determined with the following equation:

$$Tr = (EF - NSF) \cdot DS_{NS}$$

whereby NSF is the shunt humidity at 15 behind the dehumidifier 14, $DS_{NS}$ is the throughput in the bypass and EF an initial humidity at 18. The measuring and regulating detectors for the humidity are LiCl humidity indicators which are combined in a unit of humidity detectors, as described, for example in the German Gebrauchsmuster 1,978,833.

The shunt 11 also affords the opportunity to also regulate the wind via the output of a shunt pump, e.g. with the aid of comparing and registering evaporimeters, in such a way that evaporation conditions within the chamber are adjusted to the conditions outside said chamber, which improves the possibility of simulating the location climate.

The following will further explain the previously described air conditioning of the gas-exchange measuring chamber 1 with reference to details of the measuring chamber 1 and the dehumidifiers 4, 8 and 14. While some of the features are not shown herein, they are shown in detail in the above-mentioned copending application Ser. No. 618,005.

The adjustment of the temperature in the gas-exchange chamber is effected with peltier elements which are assembled into peltier aggregates or blocks. These are attached to the back sides of the chambers. Both sides of a peltier aggregate are provided with heat exchangers. The cold heat exchanger extends inside the gas-exchange measuring chamber 1. The hot outer heat exchanger can be ventilated by an axial fan. To increase the cooling still further, the warm side of the aggregate can be cooled with water or brine.

The plants are placed for gas-exchange measuring into a Plexiglas housing. The work space, for example, amounts to 7 liters. The inner, cold heat exchanger is covered with a bottom plate. A cross-current fan provides a homogeneous, inside air circulation. Below the bottom plate, the air is forced through the ribs of the cold heat exchanger and is guided inside the work space above said cover, across the plants. In this manner, carbon dioxide, water vapor and temperature gradients are largely avoided. The wind velocity inside the chamber is adjustable via the r.p.m. of the radial fan. Across from the bottom plate is located the removable, transparent cover plate of the housing.

Into the work space of the gas-exchange measuring chamber fit smaller plants, e.g. lychens or mosses. An investigation of leaves or branches of larger plants is possible also, since leaf stems or sprouts can be inserted into a slit at a narrow side of the housing. The shape of the cover plate and of the frame ensure an adequately small slit between the plant part and the housing which can easily be hermetically sealed with a permanently plastic cement. The affixing of the plants in the chamber is effected with small frames whose sizes are adjustable, and prevents touching of the walls.

Connecting possibilities are available in the chamber for measuring transmitters, such as photoelements or temperature sensors. On the side of the Plexiglas housing are exchangeable hose connections for the gas inlet and the gas outlet, 2 and 7, and cable bushings for connecting measuring instruments. The chamber is affixed at the structure, or the like, by means of laterally arranged rails, which can be installed in any desired position.

The peltier aggregate of the gas-exchange measuring chamber 1 is so designed that a temperature decline of the chamber relative to the environment temperature, of about 20° C. is obtained in the important temperature range of about −20° C. to +50° C., at full cooling capacity. At an increase of thermal stress in the peltier aggregate, e.g. by irradiation and a declining, absolute environment temperature, the temperature difference is reduced, whereby the dependency on the absolute temperature is low. Furthermore, the temperature difference depends on the air velocity within the chamber, since this influences the rate of heat transfer of the heat exchanger. A high air velocity reduces the heat resistance between air and the cold heat exchanger. Due to this heat resistance, a temperature gradient results between the air of the chamber and the cold heat exchanger.

The maximum moisture obtainable in the chamber depends on the temperature of the coldest place in the inner heat exchanger, since the dew point temperature of the measuring gas must, as a rule, be lower than the temperature of the heat exchanger. A relative humidity of approximately 80% can be obtained at an ambient temperature of 25° C. and with an air cooling of the outer heat exchanger. If a temperature higher than the ambient temperature is adjusted in the chamber, then the inner heat exchanger is always warmer than the chamber air. In this case, relative moistures up to nearly 100% can be obtained. A lower environmental temperature than 250° C. shifts the obtainable value toward smaller humidity values. This influence is, however, negligible.

The dehumidifiers 4, 8 and 14, of the type which are described in detail in copending U.S. application Ser. No. 667,754, filed Sept. 14, 1967 now U.S. Pat. No. 3,470,702, work on a cooling trap principle. The temperature adjustment is again effected with a peltier aggregate. The air, which is to be dehumidified, is guided through a flow path into a peltier-cooled metal block, where the excess water is precipitated. Before the air enters the flow path of the peltier-cooled metal block, it flows through a hollow chamber which is lined with synthetic material and whose one side is formed by the peltier-cooled metal block. There, the larger part of the vapor is precipitated, preferably at the metal block, depending on the dew point temperature, in the form of water or ice. The subsequent flow path in the metal block is virtually under no danger of icing. The combination of the two precipitating chambers, connected behind one another, affords a precision adjustment of the absolute moisture by means of a peltier-cooled metal block.

The precipitated water is collected in an outside vessel. Connecting pipes are provided at the dehumidifier for hoses to remove the water. All parts which come into contact with the measuring gas are comprised of stainless steel or synthetics. The warm side of the peltier apparatus has an air-temperature exchanger. A good heat removal is ensured by a cross-current blower.

The temperature pilot value for the regulating device 5 and 16 is measured by a platinum resistance thermometer, which is arranged in the metal block of the dehumidifier. The dew point temperature of the dehumidifier can be maintained between −20° C. and +60° C. within ±0.1° C.

In summary, the air conditioning can be effected by the described device, within a temperature constancy of ±½° C. and a relative humidity control of at least ±2%.

In the figure a second gas supply 19 is supplied to the gas analyzer 9. The gas analyzer 9 can be supplied with a standard gas, via the gas line 19. The measured value of the gas analyzer 9 is obtained, as a difference between the $CO_2$ content of the gas in the gas removal 7 and the $CO_2$ content of the standard gas, which is supplied via gas line 19 to the gas analyzer 9. Gas line 19 may be connected by a three-way valve 20 to a gas line 21 or a gas line 22. The gas analyzer 9 can be supplied, via gas line 21, with a standard gas of an arbitrary $CO_2$ concentration. The gas line 22 branches off from the gas supply 2 and is in parallel with the gas-exchange measuring chamber 1 and supplied to the three-way valve 20, by interconnecting a dehumidifier. In this gas line 22, the gas analyzer 9 is supplied with the measuring gas, pumped into gas-exchange measuring chamber 1, as a standard gas. The dehumidifier 8 in gas line 22 which dries the measuring gas that is supplied as a standard gas, is also connected into the gas outlet 7. Deviating from the aforedescribed type, this dehumidifier 8 is provided with two separated flow paths, in a metal block. The flow paths are designed in the aforedescribed manner. As previously mentioned, the dew point is adjusted so low in this dehumidifier 8, that the passed gas is completely dried. It is sufficient, e.g. to adjust the dew point temperature to 1° C., at an environmental temperature of 35° C., a dew point of the flowing-in gas of 30° C. and a throughput of 1 liter per minute for each gas path. When the dew point temperature is lower, the environment temperature or the flow rate, can have higher values than indicated above.

If, due to the assimiliation of the installed plants, $CO_2$ is consumed in the gas-exchange measuring chamber 1, then $CO_2$ must be supplied in order to keep the gas combination in the gas-exchange measuring chamber constant and in order to prevent the measured value of the assimilation from being falsified. $CO_2$ is supplied to the gas-exchange measuring chamber 1 via the gas line 23, from a gas container 24. A control valve 25 and a flow meter 26 are provided in the gas line 23. The regulating valve 25 is controlled by a regulator 27 whose controlling magnitude is constituted by the measured value of the gas analyzer 9. Thus, the regulation is effected in dependence on the difference between the $CO_2$ content of the measuring gas and the $CO_2$ content of the standard gas, which is determined in the gas analyzer. In order to obtain the most exact dosing, with the aid of the regulating valve 25, it is preferable to supply the gas-exchange measuring chamber 1 with air having a $CO_2$ content of up to 20%. In a known $CO_2$ concentrtaion of the gas, supplied via gas line 23, the $CO_2$ absorption by the organism in gas-exchange measuring chamber 1 can be determined per time unit with the aid of the flow meter 26. Said measuring has an error of approximately 4%, which is comprised of a regulating inaccuracy, and errors in the dosing apparatus 25 and in the flow meter 26.

During a rsepiration of the plants, arranged in the gas-exchange measuring chamber 1, $CO_2$ must be removed from the measuring chamber in order not to alter the composition of the measuring gas and to avoid falsifications in the measured value. To this end, a second shunt 28 to the gas-exchange measuring chamber 1 is provided. Thus shunt contains a pump 29 with variable pump velocity, a flow counter 30 and a vessel 31 with a binding agent for the $CO_2$ gas. Suitable binders for $CO_2$ gas are $CO_2$ absorbing means, such as sodium hydroxide (NaOH) or potassium hydroxide (KOH). The pump velocity of the pump 29 can be varied via a regulator 32 whose control magnitude constitutes the measured value of the gas analyzer 9. With the aid of said pump 29, gas is sucked into the shunt 28 and, after having passed through the sodium hydroxide in vessel 31, is again pumped back into the gas-exchange measuring chamber 1. Due to the sodium hydroxide, the $CO_2$ gas is again completely removed from the repumped air. This lowers the $CO_2$ concentration in the gas-exchange measuring chamber 1. The respiration, per time unit, of the plants located in the gas-exchange chamber can also be determined from the measured value of the flow meter 30, because the $CO_2$ concentration in the gas-exchange measuring chamber is kept constant through the compensation, by means of the bypass and is identical with the $CO_2$ concentration of the standard gas. The measured value is also subject to an error of approximately 4%, which is composed of the same magnitudes as the error occurring during the measuring of the assimilation per time unit. The error obtained while the assimilation is measured per time unit, as well as the error produced while the respiration is measured per time unit, is in the same order of magnitude as the error which is obtained during measuring in the gas analyzer. The check valve 33 in the shunt 28 is provided in order to prevent a return of the measuring gas, located in the gas-exchange chamber 1, when shunt 28 is inoperable.

The measuring device shown in the figure and described so far, can be extended to form a closed system if the gas outlet 7 is connected with the gas inlet 2 by means of a gas line 34 in which a pressure relief valve 35 is provided.

The afore-described apparatus makes it possible to determine the $CO_2$ assimilation per time unit or the respiration per time unit, according to the compensation principle. The gas analyzing instrument is used as a null instrument. In an open system, this affords a follow-up regulation, which permits the adjustment of the gas composition in the gas-exchange measuring chamber with respect to the $CO_2$ content, to the composition of the location air. To this end, the measuring gas sucked in at the location of the chamber is supplied to the gas analyzer 9 as a standard gas, via the gas supply line 22, parallel to the gas-exchange measuring chamber 1. A datum value regulation is also possible in an open, as well as in a closed system, to which end the gas analyzer 9 is supplied a standard gas with arbitrary $CO_2$ content, via gas line 21. This also makes possible a program control of the gas composition in the work space of the gas-exchange measuring chamber 1.

Another embodiment of the device shown in the figure needs to be mentioned, and is possible in a closed system. In a closed system the bypass 28, which is shown in the figure as a shunt for the gas-exchange measuring chamber 1, can be arranged as a shunt for the gas outlet 7, between the gas-exchange measuring chamber 1 and the dehumidifier 8. Instead of the pump 29, whose pump velocity is variable, a controllable mixing valve can be provided which is also controlled by a regulating system and whose control magnitude is the measured value of the gas analyzer. The mode of operation of the device in a closed system is in no way influenced thereby.

Preferably, two flow meters 36 and 37 should also be mentioned which are connected with the gas analyzer in the gas outlet. These flow meters afford a control over the gas flow of the entire apparatus.

We claim:

1. Apparatus for controlling and for determining changes in the $CO_2$ content in a gas-exchange measuring chamber, which contains plants, living plant parts or organisms, which comprises a chamber air conditioned by peltier elements, a gas inlet into which standard gas of known composition can be pumped, a gas outlet containing a peltier-cooled dehumidifier and a gas analyzer, wherein a measured value can be determined as a difference between the $CO_2$ content of measuring gas coming from a gas measuring chamber and the $CO_2$ content of a supplied standard gas wherein the $CO_2$ gas is supplied, via a regulating valve and a flow meter, to the gas-exchange measuring chamber, a bypass to the gas-exchange measuring chamber wherein a flow meter and means for changing the flow rate and for binding the $CO_2$ gas are arranged, whereby the regulating valve and the means which regulate the flow are each provided with a regulating system and the control magnitude of each regulator constitutes the measured value of the gas analyzer.

2. The apparatus of claim 1, wherein a variable pump is provided for regulating the flow in the bypass.

3. The apparatus of claim 1, wherein said means for supplying gas is adapted to produce up to 20% $CO_2$ content of gas to the gas-exchange measuring chamber.

4. The apparatus of claim 2, wherein the outlet of the gas analyzer is connected by a gas line to the gas inlet of the gas-exchange measuring chamber.

5. The apparatus of claim 4, wherein a pressure relief valve is between the gas analyzer and the gas supply.

6. The apparatus of claim 5, wherein the bypass, with the flow meter and the binder for the $CO_2$ gas, is arranged in the gas outlet between the gas-exchange measuring chamber and the dehumidifier, and a mixing valve for changing the flow rate, said mixing valve controlled by a regulating system whose control magnitude constitutes the measured value of the gas analyzer.

7. The apparatus of claim 1, wherein sodium hydroxide is provided to bind up the $CO_2$ gas.

References Cited

UNITED STATES PATENTS

| | | | |
|---|---|---|---|
| 3,063,195 | 11/1962 | Ravich | 47—17 |
| 3,348,922 | 10/1967 | Bose et al. | 47—17 X |
| 3,398,481 | 8/1968 | Lake | 47—17 X |

FOREIGN PATENTS

| | | |
|---|---|---|
| 1,143,403 | 2/1969 | Great Britain. |

ROBERT E. BAGWILL, Primary Examiner

U.S. Cl. X.R.

23—63